United States Patent
Martin et al.

(10) Patent No.: US 10,860,755 B2
(45) Date of Patent: Dec. 8, 2020

(54) AGE MODELLING METHOD

(71) Applicant: CHANEL PARFUMS BEAUTE, Neuilly sur Seine (FR)

(72) Inventors: Victor Martin, Paris (FR); Renaud Séguier, Acigne (FR); Aurélie Porcheron, Colombes (FR)

(73) Assignee: CHANEL PARFUMS BEAUTE, Neuilly sur Seine (FR)

(*) Notice: Subject to any disclaimer, the term of this patent is extended or adjusted under 35 U.S.C. 154(b) by 105 days.

(21) Appl. No.: 16/227,745

(22) Filed: Dec. 20, 2018

(65) Prior Publication Data
US 2019/0197204 A1 Jun. 27, 2019

(30) Foreign Application Priority Data
Dec. 22, 2017 (EP) ..................... 17306901

(51) Int. Cl.
*G06F 30/20* (2020.01)
*G06T 7/50* (2017.01)
*G06T 17/00* (2006.01)
*G06T 7/00* (2017.01)
*G06T 7/70* (2017.01)
(Continued)

(52) U.S. Cl.
CPC ......... *G06F 30/20* (2020.01); *G06K 9/00281* (2013.01); *G06K 9/6247* (2013.01); *G06T 3/0093* (2013.01); *G06T 7/0012* (2013.01); *G06T 7/50* (2017.01); *G06T 7/70* (2017.01); *G06T 17/00* (2013.01); *G06F 2111/10* (2020.01); *G06K 2009/00322* (2013.01); *G06T 2207/20024* (2013.01); *G06T 2207/20076* (2013.01); *G06T 2207/20121* (2013.01);
(Continued)

(58) Field of Classification Search
None
See application file for complete search history.

(56) References Cited

U.S. PATENT DOCUMENTS

2009/0028380 A1* 1/2009 Hillebrand .............. G06T 11/60
382/100

FOREIGN PATENT DOCUMENTS

| KR | 10-2016-0075501 A | 6/2016 |
|---|---|---|
| WO | 2009/014832 A1 | 1/2009 |
| WO | 2015/0048222 A1 | 4/2015 |

OTHER PUBLICATIONS

Young Ho Kwon et al: "Age Classification From Facial Images", Proceedings of the Computer Society Conference on Computer Vision and Pattern, Los Alamitos, IEEE Comp. Soc. Press, Jun. 21, 1994 (Jun. 21, 1994), pp. 762-767, XP000515929, ISBN: 978-0-8186-5827-3.

(Continued)

*Primary Examiner* — Dov Popovici
(74) *Attorney, Agent, or Firm* — Nixon & Vanderhye

(57) ABSTRACT

A method for modelling age-related traits of a face, from a picture of the face is provided, wherein the age-related traits are either wrinkles or age spots, the method including: for each age-related trait of the face of the same nature, generating a vector including parameters of shape and appearance of the trait; and generating, from the generated vectors, a single representation vector modeling the age-related traits of the same nature in the face. The single representation vector stores information regarding the number of traits in the face and joint probabilities, over the face, of the shape and appearance features of the traits.

16 Claims, 6 Drawing Sheets

(51) Int. Cl.
  *G06K 9/00* (2006.01)
  *G06K 9/62* (2006.01)
  *G06T 3/00* (2006.01)
  *G06F 111/10* (2020.01)

(52) U.S. Cl.
  CPC .............. *G06T 2207/20124* (2013.01); *G06T 2207/30088* (2013.01); *G06T 2207/30201* (2013.01)

(56) References Cited

OTHER PUBLICATIONS

Lanitis A et al: "Comparing different classifiers for automatic age estimation", IEEE Transactions on Systems, Man and Cybernetics. Part B:Cybernetics, IEEE Service Center, Piscataway, NJ, US, vol. 34, No. I, Feb. 1, 2004 (Feb. 1, 2004), pp. 621-628, XP002458796, ISSN: 1083-4419, DOI: 10.1109/TSMCB.2003.817091.

Boissieux L et Al: "Simulation of Skin Aging and Wrinkles with Cosmetic Insight", Proceedings 2000 SIGGRAPH/Eurographics Workshop on Graphics Hardware. Interlaken, Switzerland, Aug. 21-22, 2000; [SIGGRAPH / Eurographics Workshop on Graphics Hardware], New York, NY : ACM, US, Aug. 21, 2000 (Aug. 21, 2000), pp. 15-27,211, XP002357237, ISBN: 978-1-58113-257-1.

Corcuff P et al: "The impact of aging on the microrelief of peri-orbital and leg skin", Journal of the Society Cosmetic Chemists, Society of Cosmetic Chemists, US, vol. 82, Jan. 1, 1987 (Jan. 1, 1987), pp. 145-152, XP002959951, ISSN: 0037-9832.

T.F. Cootes et al. "Active Appearance Models", Proc. European Conference on Computer Vision 1998, vol. 2, pp. 484-498, Springer, 1998.

A. Lanitis et al. "Modeling the Process of Ageing in Face Images", IEEE, pp. 131-136 vol. 1, DOI 10.1109/ICCV.1999.791208.

A. Lanitis et al. Toward automatic simulation of aging effects on face images », IEEE Transactions on Pattern Analysis and Machine Intelligence, 24(4):442-455.

Bukar AM et al in "On Facial Age Progression Based on Modified Active Appearance Models with Face Texture" In Advances in Computational Intelligence Systems, vol. 513, Springer International Publishing, Cham, pp. 465-479.

D. Michael et al.: "Perception of Age in Adult Caucasian Male Faces: Computer Graphic Manipulation of Shape and Colour Information", Proc. R. Soc. Lond. B 1995 259, 137-143.

Ming-Han et al.: "Human face aging with guided prediction and detail synthesis", Multimed Tools Appl (2014) 72:801-824, Published online: Mar. 2, 2013.

EP Search Report, dated Apr. 9, 2018, from corresponding EP 17 30 6901 application.

Office Action issued in Korean Patent Application No. 10-2018-0157981 dated Jan. 17, 2019 with English translation provided.

\* cited by examiner

AGE MODELLING METHOD

FIELD OF THE INVENTION

The invention pertains to the field of image processing in order to model wrinkles and age spots of the face that are visible on a picture of the face. The invention also relates to the simulation of aging or de-aging including the simulation of wrinkles and age spots on a face.

BACKGROUND OF THE INVENTION

It is known from the publication by T. F. Cootes et al. "Active Appearance Models", Proc. European Conference on Computer Vision 1998, Vol. 2, pp. 484-498, Springer, 1998, a method of modelling a face of an individual by extraction, from a picture of the face, of some features relative to the shape and appearance of the face.

This method also allows, once the model of the face is obtained, to change some parameters of this model in order to simulate a new picture in which the shape or appearance of the face is changed.

This model has been used in particular to simulate the effect of age on the appearance of a face, as described in the two following publications:
- A. Lanitis et al. "Modeling the Process of Ageing in Face Images", IEEE, pp 131-136 vol. 1, DOI 10.1109/ICCV.1999.791208.
- A. Lanitis et al. "Toward automatic simulation of aging effects on face images>>, IEEE Transactions on Pattern Analysis and Machine Intelligence, 24(4):442-455.

The technique implemented to simulate age variation makes use of the Active Appearance Model of T. F. Cootes. Pictures of faces of a plurality of individuals forming a reference population are processed with the Active Appearance Model to extract, for each face, a model of the face.

As schematically shown on FIG. 1, this processing comprises the extraction, from one picture, of a fixed-length vector representing the shape of the face, and a fixed-length vector representing the appearance of the face.

Once the two vectors are acquired for all the faces of the population, principal component analysis is performed on all the vectors representing the shapes of the faces to obtain shape weights, another principal component analysis is performed on all the vectors representing the appearances of the faces to obtain appearance weights, and a final principal component analysis is performed on the concatenation of shape weights and appearance weights to create a subspace in which both texture and shape variations of faces are modeled.

Regression of coordinates from this newly created space on age indicates the direction of facial aging. Thus, one can project a new face in this space, translate it in the face aging direction, and reconstruct an image of the face with amended shape and texture to obtain an aged or de-aged appearance.

This approach however has a limitation in that the produced aged appearance is blurred, because high-frequency details such as wrinkles and spot are not fully considered in the model.

Facing this problem, another approach, such as the one disclosed by Bukar A M et al in "On Facial Age Progression Based on Modified Active Appearance Models with Face Texture" In Advances in Computational Intelligence Systems, vol 513, Springer International Publishing, Cham, pp 465-479, uses Active Appearance Model to produce a model of the face including appearance and shape, and adds a post-processing step on appearance to superimpose patches of high-frequency details. This post-processing is not performed based on a statistical analysis of the impact on age progression on these high-frequency details, so it may not be precise enough for simulating age progression.

Last, it is also known from WO2009/014832 a method of manipulating a facial image of a person so as to simulate wrinkle changes with age. However this method is implemented by processing a neutral image and an expression image of the face of a person, so it is not statistically learned from age progression and may not result in a relevant simulation of age progression.

DESCRIPTION OF THE INVENTION

In view of the above, the invention aims at overcoming at least one of the limitations of the prior art.

In particular, the invention aims at relevantly modeling high-frequency details of a face such as wrinkles, and using this modeling in order to simulate age variation of a person.

Another aim of the invention is to accurately reflect the effect of age variations on the evolution of wrinkles.

Another aim of the invention is to allow simulating aging of a same person according to different lifestyles or behaviors this person may have.

To this end, a method for modelling age-related traits of a face, from a picture of the face, is disclosed, wherein the age-related traits are either wrinkles or age spots, the method comprising:
- for each age-related trait of the same nature of the face, generating a vector comprising parameters of shape and appearance of the age-related trait,
- generating, from the generated vectors, a single representation vector modeling the age-related traits of the same nature in the face, wherein the single representation vector stores information regarding the number of traits in the face and joint probabilities, over the face, of the shape and appearance features of the traits.

In embodiments, the step of generating a vector comprising parameters of shape and appearance of the trait comprises:
- acquiring coordinates of a plurality of points of the trait, and
- processing said coordinates to infer shape parameters of the trait.

In a particular embodiment, the age-related traits are wrinkles, and the method comprises the acquisition of the coordinates of at least five points of each wrinkle, wherein the points are regularly spaced over the wrinkle and comprise at least one point on each end of the wrinkle.

In that case, the shape features of a wrinkle may comprise:
- coordinates of the center of the wrinkle,
- a length of the wrinkle,
- and angle of the wrinkle relative to a reference axis, and
- a curvature of the wrinkle.

The appearance parameters of a wrinkle preferably comprise a thickness $\sigma$ and depth A of the wrinkle, and the processing of the image to extract these parameters comprises, for each wrinkle:
- high-pass filtering a part of the image comprising the wrinkle,
- warping each wrinkle into a common shape,
- fitting a curve on a plurality of transverse profiles of the warped wrinkle to extract, for each profile, a value of a maximum amplitude and a width value of the fitted curve, computing A and σ from respectively the values of maximum amplitude and the width values extracted for each of the plurality of profiles.

Preferably, the curve is a second derivative Lorentzian function.

In embodiments, the single representation vector further comprises the mean features of the traits of the same nature of the face.

Preferably, the representation vector comprises:
defining at least one zone in the face and,
for each zone,
  computing joint probabilities of the age-related traits of the zone, and
  defining a zone vector comprising the joint probabilities of the age-related traits, the number of age-related traits of the zone and the mean features of the age-related traits of the zone, and
  concatenating the zone vectors to obtain the representation vector.

In a preferred embodiment, the joint probabilities of the age-related traits are approximated by computing joint probabilities of every features of the vector representing each trait taken two at a time.

A method for modeling age of people is also disclosed, comprising:
processing pictures of faces of a plurality of individuals forming a reference population, to extract, for each picture,
  at least one of a wrinkles model and an age spots model, either one of the latter being obtained by implementing the method described above,
  a shape model, and
  an appearance model,
performing respective principal component analyses, on the plurality of wrinkles and/or age spot models, shape models and appearance model, to obtain respectively wrinkles and/or age spots, shape and appearance weights,
performing a principal component analysis on the wrinkles and/or age spots, shapes and appearance weights, to obtain aggregated weights, and
inferring a relation between aggregated weights and age or perceived age by fitting of a function.

The reference population may be selected as having similar lifestyles as to at least one of the following:
smoking,
drinking alcohol,
sun exposition,
nutrition,
use of skincare product.

The reference population may also be selected according to gender, geographical location and ethnicity.

In embodiments, the method for modelling age of people may further comprise a step of simulating an age variation of a person, comprising:
selecting one aggregated weight of the plot corresponding to the picture of the face of the person,
identifying the corresponding age or perceived age,
simulating, with the fitted function, an updated aggregate weight for a modified age or perceived age according to the age variation, and
processing the updated aggregate weight to infer a picture of the face of the person corresponding to the age variation.

A computer program product is also disclosed, comprising instructions for performing a method according to the description above, when it is executed by a processor.

A picture processing unit is also disclosed, comprising a memory storing instructions and a calculator adapted to execute instructions stored in the memory, wherein the picture processing unit is configured for receiving at least one picture of a face of a person and for implementing, on the received picture(s), the method according to the above description.

The method according to the invention allows generating a fixed-length representation of the wrinkles of a face, from a picture of the face, whatever the age of the person from which the picture is taken. More specifically, no matter the number and appearance of the wrinkles, the vector modeling all the wrinkles is always of the same size.

As a consequence, the vectors modeling the wrinkles of a plurality of faces can be subjected to Principal Component Analysis, and therefore this wrinkle modeling can be incorporated in the Active Appearance Model for an increased precision and relevancy of this model.

With this model, it is possible to accurately simulate age variation and produce pictures with an aged appearance. It is also possible to simulate various aged appearances according to the lifestyle of the person, and recommend particular skincare products in order to reduce the effect of ageing on visual cues of the face which affect the perception of age.

DESCRIPTION OF THE DRAWINGS

Other features and advantages of the invention will be apparent from the following detailed description given by way of non-limiting example, with reference to the accompanying drawings, in which.

DETAILED DESCRIPTION OF AT LEAST ONE EMBODIMENT OF THE INVENTION

A method for modelling age-related traits of a face of a person will now be described with reference to FIGS. 2 and 3.

In all that follows, age-related traits relate to wrinkles or age spots, which are two visual cues which tend to increase with age and which therefore affect the perception of age.

Figure 8:
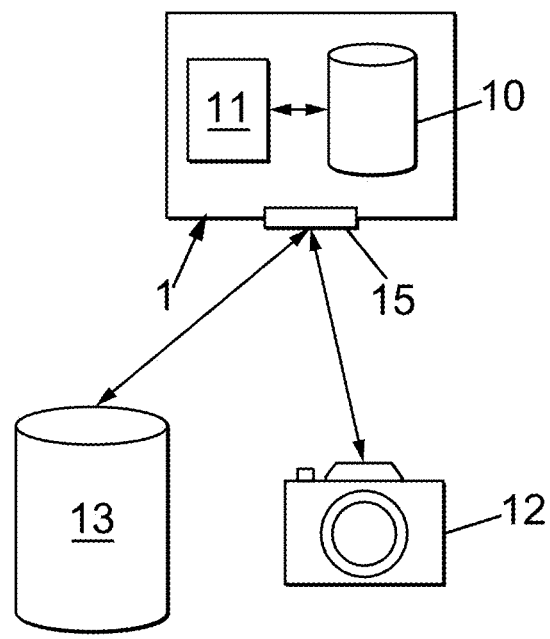
FIG. 8 schematically shows a system for performing a method according to one embodiment of the invention.

This method may preferably be implemented by a picture processing unit 1 shown schematically on FIG. 8, which comprises a memory 10 storing code instructions, preferably software instructions, for processing pictures and data extracted from the pictures, according to the method disclosed below. The picture processing unit 1 also comprises a calculator 11 configured for executing the code instructions. The calculator may preferably be a processor, a microprocessor or else may be a microcontroller.

The pictures to be processed by the picture processing unit are preferably loaded from a camera 12 or a storage device 13, through a dedicated interface 15. The storage device may be a portable storage device such as a SD card, a USB stick. It may also be a fixed memory such as a local or remote database to which the picture processing unit is connected.

Method for Modelling Wrinkles or Age Spots

Back to FIGS. 2 and 3, the processing of a picture of a face in order to extract a vector modeling either the wrinkles or the age spots of the face will now be described. In the case where the modelling of both wrinkles and age spots is desired, this modelling may be performed separately, once for wrinkles, and once on age spots.

The method first comprises a step of generating 100, for each age-related trait of the face of a same nature (i.e. wrinkle or age spot), a vector storing shape and appearance features of the trait.

During a first sub-step 110, the trait is annotated with a plurality of points, which coordinates are acquired. Annotation is preferably performed manually by an operator on the image of the face.

In a preferred embodiment, when the trait is a wrinkle, each wrinkle is annotated with at least 5 points, and even more preferably with exactly 5 points. In a preferred embodiment, the points are regularly positioned along the length of the wrinkle, with one of the points being located at each end of the wrinkle. Thus in the case of 5 points, two of the points are located at the ends of the wrinkle, one is located at the center, and the remaining two are located at half-distance between the center and the respective ends.

In the case of a spot, the plurality of points may preferably be distributed regularly around the boundary of the spot.

The coordinates of the annotation points are then processed during a sub-step 120 to infer a plurality of shape features.

Preferably, the shape features of a wrinkle comprise:
Coordinates $(c_x, c_y)$ of the center of the wrinkle,
The length l of the wrinkle, which is equal to the geodesic distance between the first and last points of annotation,
The angle α of the wrinkle with reference to a predefined axis, for instance the horizontal axis,
The curvature C of the wrinkle computed as least squares minimization of:

$$\min \|Y - CX^2\|_2^2$$

With X and Y being respectively abscissa and ordinates of the wrinkle centered with the origin, and with first and last points horizontally aligned.

Therefore in the case of wrinkles, the shape can be modelled with 5 parameters: $(c_x, c_y, \ell, \alpha, C)$.

In the case of a spot, the coordinates of annotation points may be processed to fit a predetermined shape on the spot, for instance a circle or an ellipse, and the shape parameters may comprise the parameters characterizing the fitted shape (for instance coordinates of the center or of the focuses, radius or semi major axis and semi minor axis, angle with reference to a predefined axis). The vector is preferably built such that, whatever the shape fitted on the spot, it has the same length.

According to a preferred embodiment, the shape features of an age spot comprise:
Coordinates $(c_x, c_y)$ of the center of the age spot,
The lengths $\ell_{MAJ}$ and $\ell_{min}$ of the age spot, which is equal respectively to the length of the major axis and the length of the minor axis. These axes are the axes of an ellipse fitted on the points along the boundaries of the age spot,
The angle α of the age spot with reference to a predefined axis, for instance the horizontal axis, Therefore in the case of age spots, the shape can be modelled with 5 parameters: $(c_x, c_y, \ell_{MAJ}, \ell_{min}, \alpha)$.

The method then comprises the extraction 130 of appearance features from each wrinkle or age spot.

To do so in the case of wrinkles, each wrinkle is selected by generating a bounding box around it, and each box is high-pass filtered in order to remove the low-frequency information which relates to skin color, and keep the high-frequency information which relates to the wrinkle appearance itself.

This high-pass filtering is performed by Gaussian difference between the part of the image contained in the box and a blurred version thereof.

Figure 4A:
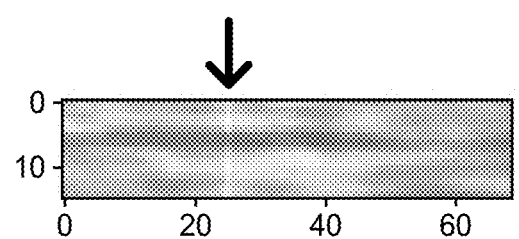
FIG. 4a represents a wrinkle warped to a mean shape and a selected intensity profile of the wrinkle.

Wrinkle appearance is then warped into a predefined shape. This predefined shape can for instance be a mean shape of the wrinkles of the face. It can also be a mean shape, on a particular zone of the face, of the wrinkled of a plurality of images of faces. In a particular embodiment shown on FIG. 4a, the predefined shape can also be a horizontal wrinkled of determined length.

A curve is then fitted on each of a plurality of transverse profiles of the wrinkle. In the exemplary embodiment of FIG. 4a, the transverse profile is a column of pixels of the bounding box, each pixel having an associated grey level or intensity. In an embodiment, a curve may be fitted to each of all the columns of pixels of the bounding box. However it is preferred that fewer columns be selected in order to limit computational needs. Thus a sampling rate may be defined according to a balance between the precision of the method and the computational needs. For instance, the wrinkle may be sampled with between five and ten columns of pixels over its length.

Figure 4B:
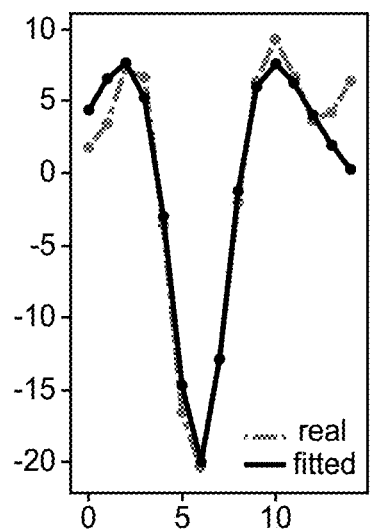
FIG. 4b represents a second derivative Lorentzian curve fitted against the selected intensity profile of FIG. 4a, FIG. 5 shows an example of a subset of joint probabilities for frown lines of one person.

Preferably, the curve is a second derivative of a bell curve, in particular a second derivative Gaussian function or a second derivative Lorentzian function, as in the exemplary embodiment of FIG. 4b, which shows the fitting of such function on an intensity profile of the wrinkle.

A second derivative Lorentzian function is of the form:

$$f(x) = A \cdot \frac{2\sigma(3(x-\mu)^2 - \sigma^2)}{((x-\mu)^2 + \sigma^2)^3} + o$$

Where:
o is an offset parameter along the ordinate axis,
μ is an offset parameter along the abscissa axis,
A is the peak amplitude of the function, and
σ is the standard deviation of the function.

Thus during a second derivative Lorentzian function can be fitted by least-squares minimization to each of a plurality of intensity profiles of a wrinkle, to infer values A and σ which represent respectively the depth and width of the wrinkle.

Respective mean values $\overline{A}$ and $\overline{\sigma}$ are preferably computed from the values obtained from the fitting of the function on each intensity profile.

During an alternative step 130' in the case of age spot, appearance parameters may be computed as mean or median values of the spot, minus the mean or median values of the skin surrounding the spot.

A sub-step 140 then comprises generating a vector comprising the shape and appearance features. According to the example given above regarding wrinkles, the vector is the set of seven parameters as follows: $(c_x, c_y, \ell, \alpha, C, \overline{A}, \overline{\sigma})$.

The method then comprises a step 200 of generating a single, fixed-length, representation vector modeling all the wrinkles of the face, or all the age spots of the face. By "fixed-length" is meant that the representation vector has the same length whatever the number and disposition of the wrinkles/age spots in the face.

This fixed-length representation allows, as will be explained in more details below, to perform a principal component analysis over a plurality of representation vectors acquired on a population.

The representation vector comprises at least one probability density modeling the structure and disposition of wrinkles or age spots for each face. Preferably, each face is divided into a number of zones, such as for example: forehead, nasolabial folds, chin, cheeks, etc. The number of zones may be at least five, and in the following example is equal to 15. In another embodiment, the process may be performed over a single zone defined over the whole face.

Step 200 comprises a sub-step 210 of computing joint probabilities, over the face, of the shape and appearance features of the wrinkles/age spots obtained at the end of step 100. Preferably, joint probabilities are computed for each of the plurality of the zones composing the face.

In the example given above regarding wrinkles, the vector representing one wrinkle has seven parameters, so the joint probability is $P(d_1, \ldots d_7)$, where $d_i$, $i=1 \ldots 7$ is the $i^{th}$ variable of the vector representing one wrinkle.

Such joint probability can have a large memory footprint because of dimensionality. To circumvent this problem, according to a preferred embodiment, said joint probability is approximated by computing every joint probability for every random variable taken two at a time. Therefore $P(d_1, \ldots d_7)$ is approximated by the set $\{P(d_1,d_2), P(d_1,d_3), \ldots, P(d_6,d_7)\}$, where each of $P(d_i, d_j)$ describes the distribution of the trait parameters $d_i$ and $d_j$ for the current zone.

For vectors having 7 parameters, a number of 21 joint probabilities is computed. The computation is preferably performed by Kernel Density Estimation (KDE).

Preferably, this computation is performed on the parameters of the vector representing a trait (wrinkle or age sport), from which an average trait has been subtracted. An average trait is a vector having the same structure as those obtained at the end of step 100, which parameters are respectively the mean values of the parameters of the vectors computed on the considered zone.

Figure 5:
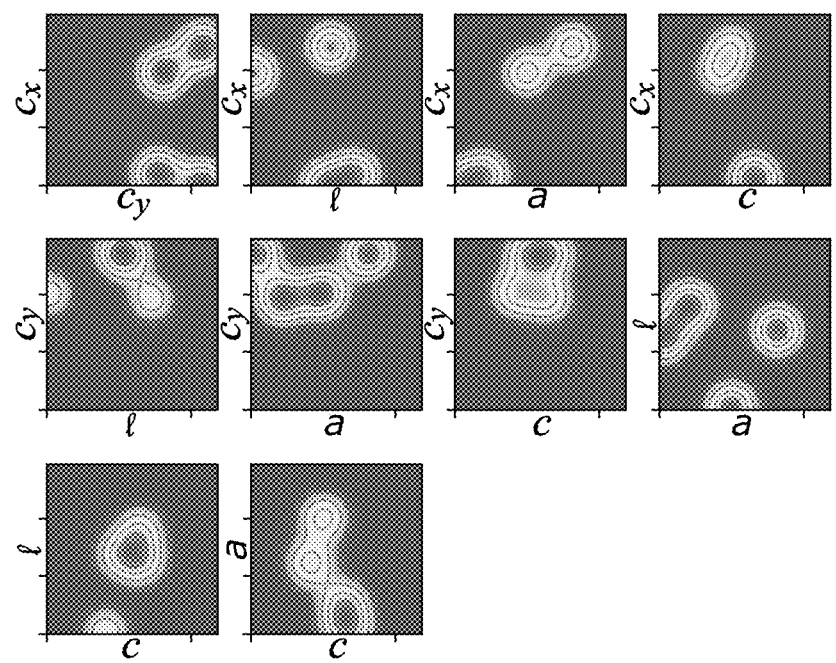

An example of some of the joint probabilities of the set computed for one zone of the face corresponding to the frown lines of one person is shown on FIG. 5, comprising 10 of the 21 joint probabilities of the set.

The method then comprises a sub-step 220 of building a vector, which comprises, for each of the zones of the face:
The number of wrinkles or age spots of the zone,
The average wrinkle or age spot of the zone, and
The 21 joint probabilities computed on wrinkles or age spots where the average wrinkle (resp. age spot) has been substracted.

In order to convert the joint probabilities into a vector, for instance the values of the joint probabilities for each line of the zone of the face may be appended to the vector at the end of the previous line.

Last, the vectors built for each zone are concatenated to create the representation vector of the wrinkles or age spots of the face.

It is important to underline that this method can be inverted in order to reconstruct, from a representation vector, a set of wrinkles or a set of age spots. A method 300 for reconstructing age related traits from said representation vector will now be described with reference to FIGS. 6a to 6e.

The following process is performed iteratively until the number of wrinkles or age spots of the zone is reached.

A first step 310 comprises detecting a peak of one of the joint probabilities $P(d_i,d_j)$, and initiating a vector with the values the corresponding values of the peak. According to a particular example regarding reconstruction of wrinkles, the peak may preferably be detected for the joint probabilities $C_x$, $C_y$ of the coordinates of the center of a wrinkle. In the example shown in FIG. 6a, $C_x=39$, $C_y=41$ and the initiated vector is (39,41,0,0,0,0,0). It means that the reconstructed wrinkle will have $C_x=39$ and $C_y=41$.

A next step 320 comprises determining a third parameter d which value maximizes each of the joint probability between the two first parameters and the third one. In the previous example, this step is about maximizing the joint probabilities $P(c_x=39, d)$ and $P(c_y=41, d)$.

Figure 1:
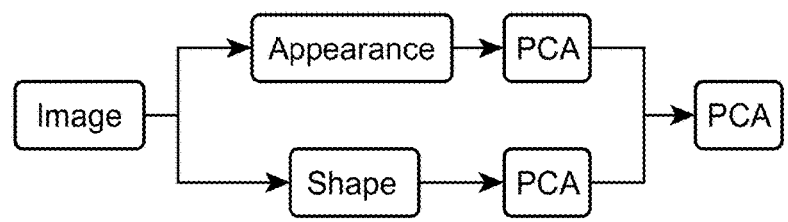
FIG. 1, already presented, schematically shows the implementation of the Active Appearance Model.
Figure 6A:
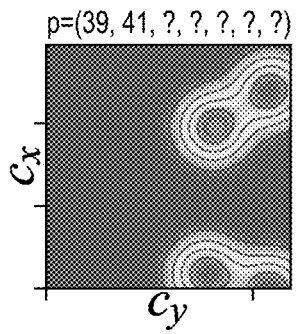
FIGS. 6a to 6e illustrate an example of reconstruction of a representation of wrinkles from a wrinkle model.
Figure 6B:
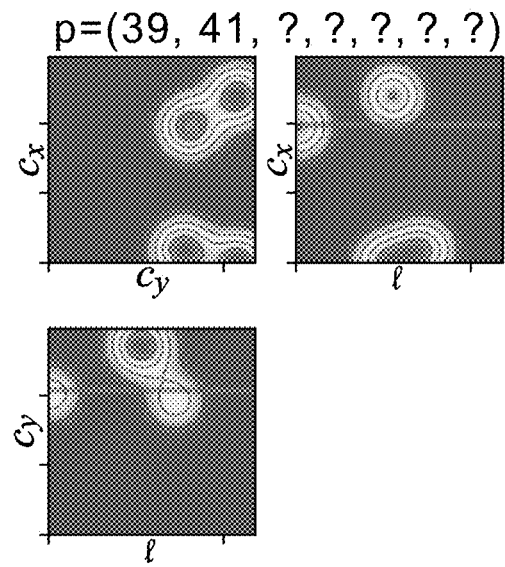
Figure 6C:
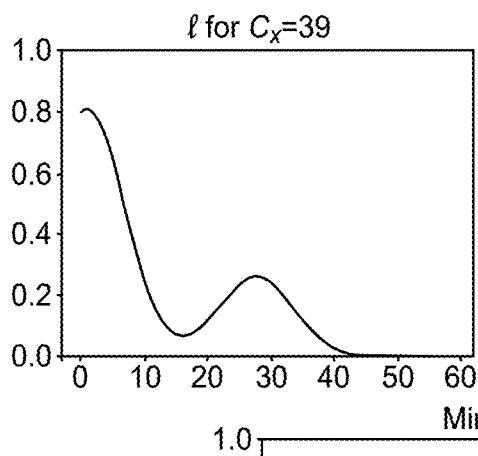
Figure 6C:
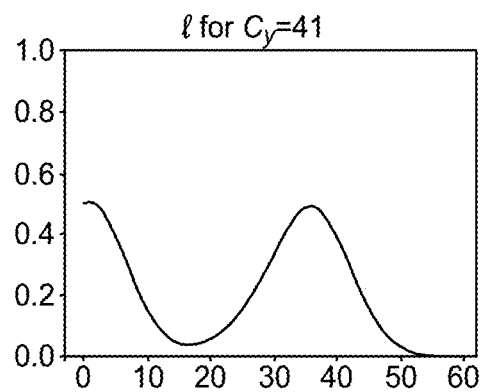
Figure 6C:
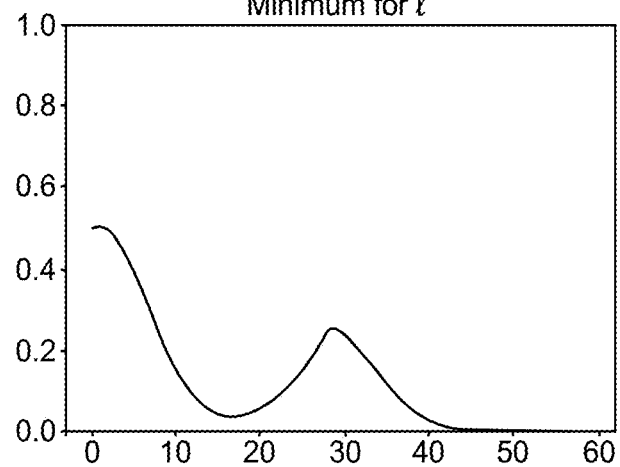

According to the example given in FIGS. 6b and 6c, the third parameter d is the length l of the wrinkle. On FIG. 6c, 1-D densities $P(c_x=39, l)$ and $P(c_y=41, l)$ are extracted, and an element-wise minimum operator is applied of said 1-D densities to obtain the third curve. The value of l is selected as the coordinate with highest probability, as argmax(min(P$(c_x=39, l)$, $P(c_y=41, l)$. According to the example shown in the figures, l=1.

Figure 6D:
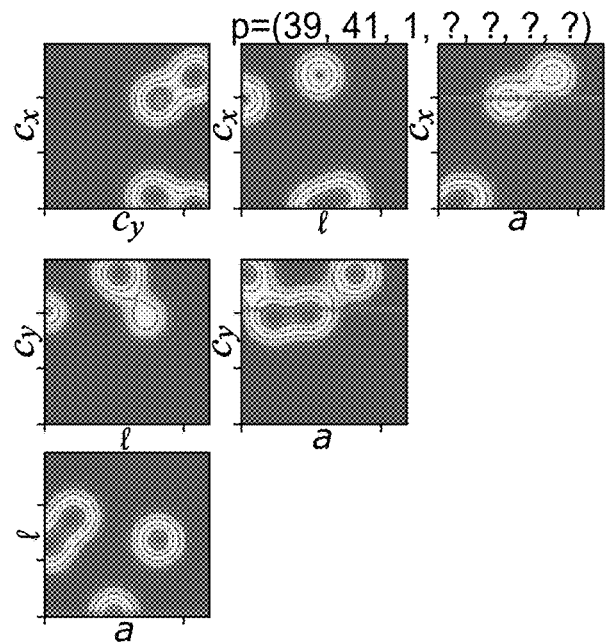
Figure 6E:
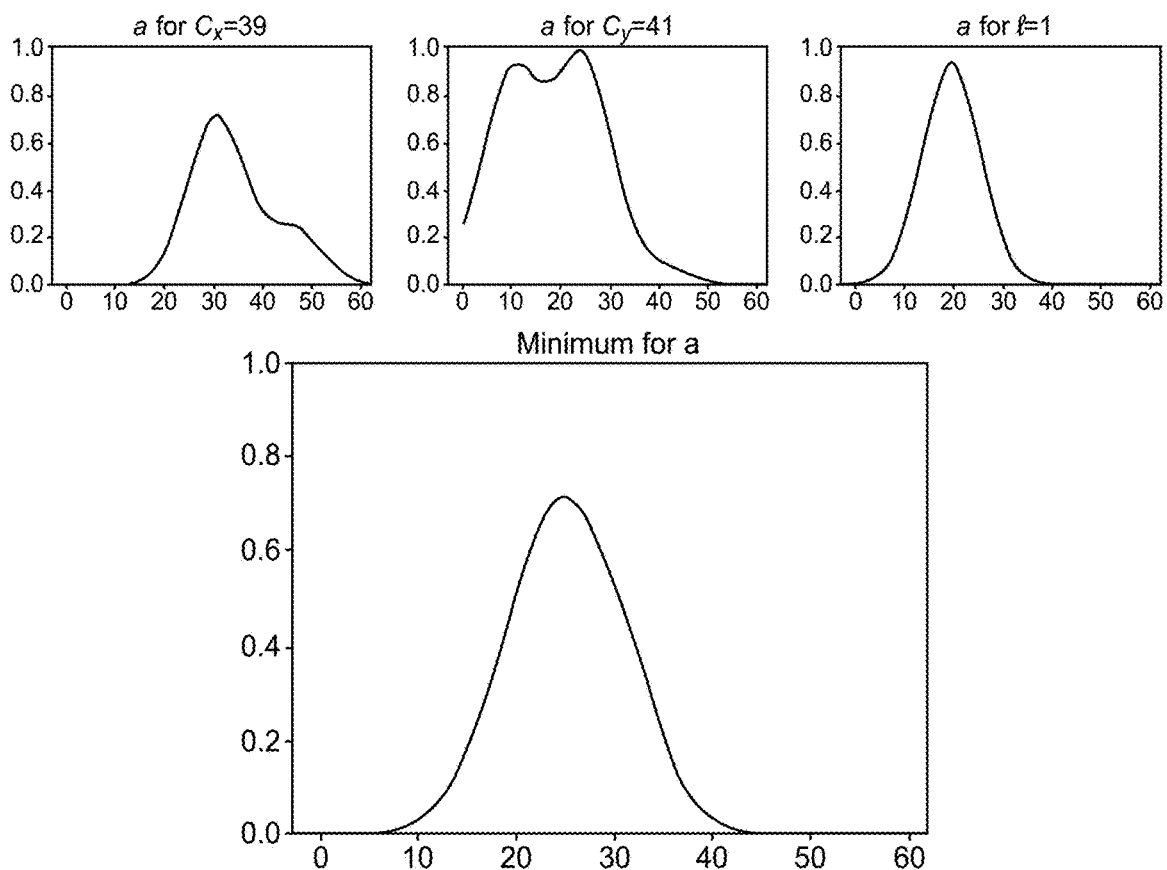
Figure 7:
FIG. 7 shows an example of the results of an aging simulation method according to one embodiment of the invention, showing in the middle an original image of a face of a person, on the left the same person rejuvenated 20 years, and on the right the same person aged 20 years.

As shown on FIGS. 6d and 6e, this step is then iterated for finding the fourth parameter d'. In the figures, the fourth parameter is chosen as $\alpha$. 1-D densities $P(c_x=39, \alpha)$, $P(c_y=41, \alpha)$, $P(l=1, \alpha)$ are extracted, and a curve is generated as the result of the element-wise minimum operator, and the value of $\alpha$ is selected as the maximum of this curve:

$$\alpha = \text{argmax}(\min(P(c_x=39, \alpha), P(c_y=41, \alpha), P(l=1, \alpha))).$$

This step is iterated until finding all parameters of the wrinkles.

When all the parameters are obtained, they are summed to the parameters of the mean trait, to obtain the parameters characterizing the trait to be reconstructed.

The trait can be trivially produced from shape and appearance parameters. According to the previous example given for the wrinkles, shape is created from the shape parameters $(c_x, c_y, l, \alpha, C)$ by sampling a polynomial defined by the curvature until the desired length l is reached, and points composing the shape are rotated according to an angle $\alpha$, and the shape is centered on the center $c_x, c_y$. Appearance is produced by creating an empty image and affecting to each column a variation profile according to a second derivative Lorentzian function of parameters $(A, \sigma)$.

Finally, appearance is warped into the newly created shape.

Method for Modeling Age of People

Figure 2:
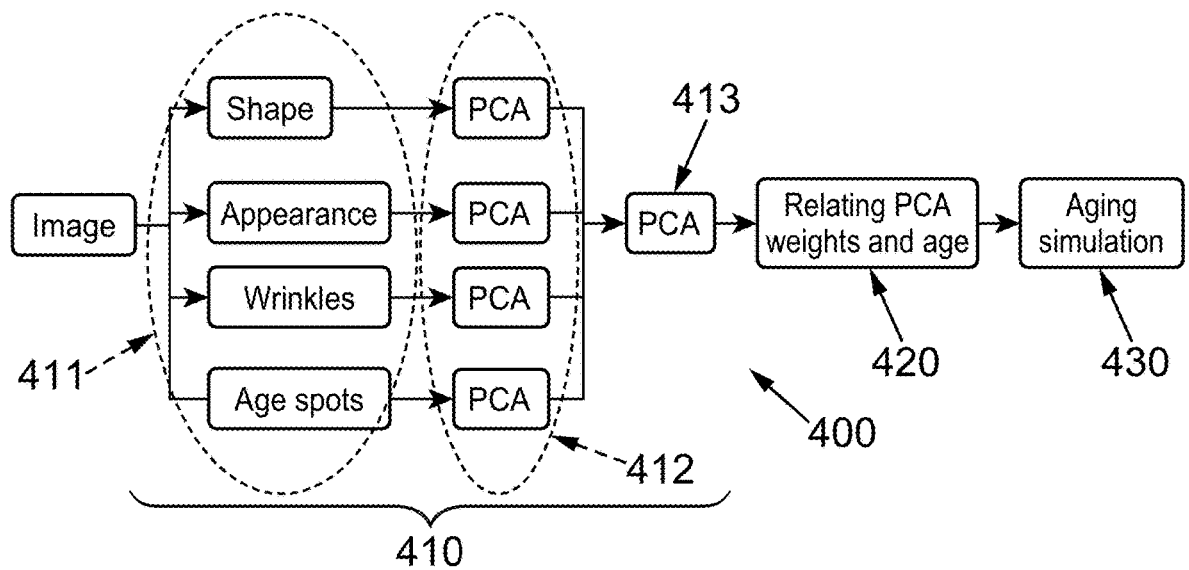
FIG. 2 shows an embodiment of the modelling method and its integration into the Active Appearance Model to model the face of a person.
Figure 3:
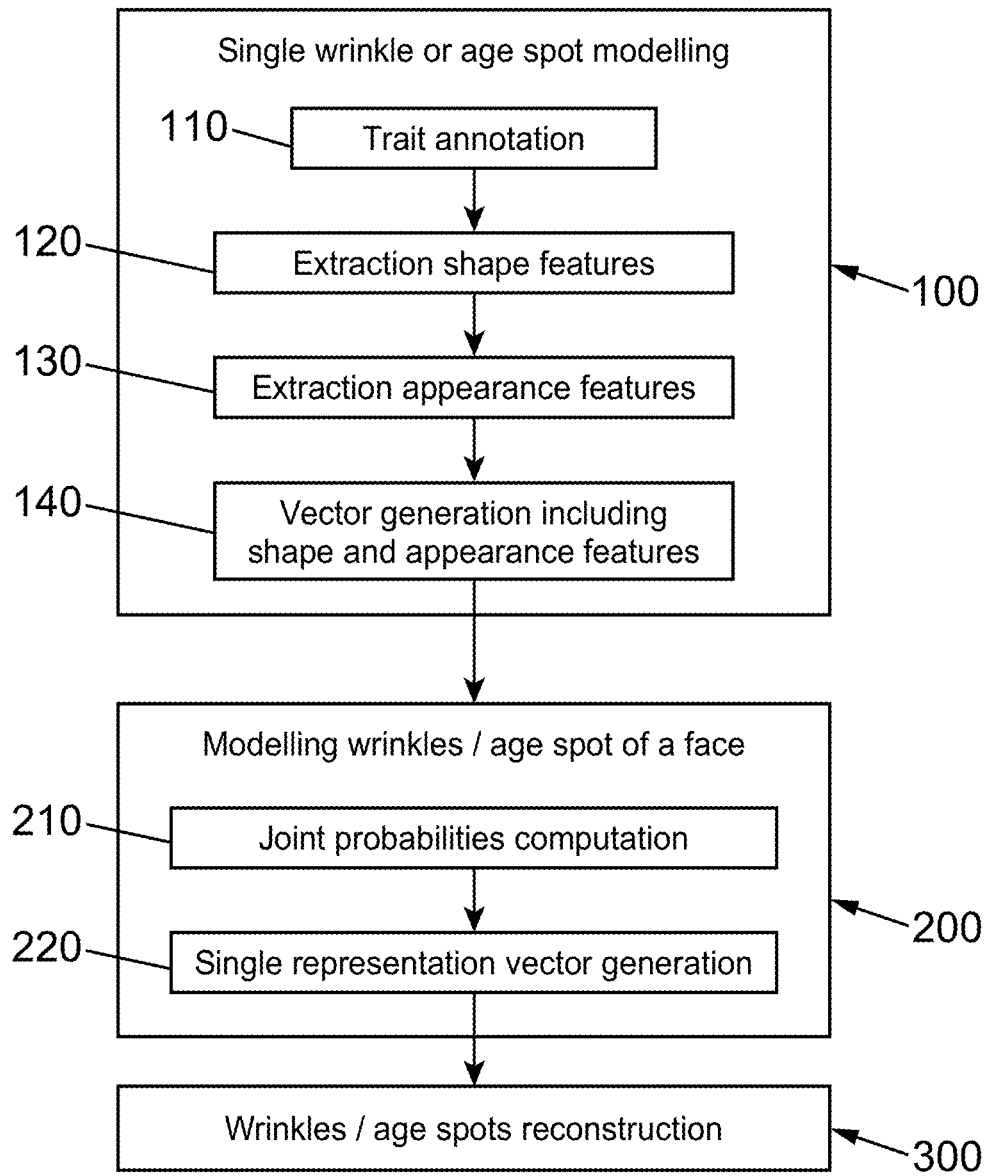
FIG. 3 shows the main steps of a modelling method according to an embodiment of the invention

With reference to FIG. 2, a method for modeling age of people will now be described.

This method 400 comprises processing 410 pictures of faces of a plurality of individuals forming a reference population, to infer a face model.

The processing of each picture 411 may comprise:
- Extracting a vector modeling shape parameters of the face, thereafter called "shape modeling vector",
- Extracting a vector modeling appearance parameters of the face, thereafter called "appearance modeling vector", and
- Extracting a vector modeling the wrinkles of the face according to the method described above, thereafter called "wrinkles modeling vector", and/or
- Extracting a vector modeling the age spots of the face according to the method described above, thereafter called "age spots modeling vector".

According to a preferred embodiment of the invention, the extraction of shape and appearance parameters is performed according to the Active Appearance Model detailed in the publication of Cootes et al. cited above. Other face models may be used, such as the one disclosed in the article by G. J. Edwards, A. Lanitis, C. J. Taylor and T. F. Cootes "Statistical Face Models: Improved Specificity. Image and Vision Computing, Vol. 16, no 3, pp 203-211, 1998.

Therefore a set of shape modeling vectors, a set of appearance modeling vectors, and a set or wrinkles modeling vectors and/or age spots modeling vectors are obtained for the reference population.

The processing comprises performing 412 a Principal Component Analysis (PCA) respectively on each set of vectors, and a final PCA 413 on the results of each previous PCA to create a space modeling variations of faces in shape, appearance and wrinkles relative to a mean face of the reference population.

Therefore each picture processed accordingly results in a vector $W_i$ of weights in the created space.

The weights matrix W of the reference population are then related during a step 420 to age or perceived age of the persons from which the pictures were taken.

A regression is then performed between PCA weights W of the projections of the pictures into the space, and the ages or perceived ages A of the reference population. Preferably, a cubic polynomial regression is performed in order to obtain the best results:

$$f(W) = K^T W^3 + L^T W^2 + M^T W + N = A$$

Where K, L, M and N are matrices of parameters of the regression function f. Preferably, regression is performed by linear least squares regression.

A face of the reference population may then be made to look older or younger during a step 430 by:
- Selecting the weight $W_{current}$ corresponding to the face, and corresponding to the age or perceived age a of the person,
- Simulating, with the regression function, a weight $W_{new}$ corresponding to the same face with an age variation of y years (y can be positive or negative in order to simulate aging or de-aging), said weight being computed with the following formula:

$$W_{new} = W_{current} + (f^{-1}(a+y) - f^{-1}(a))$$

With $f^{-1}(a)$ being computed as a mean PCA weight $W_{mean,a}$ corresponding to the age a, given that multiple different faces can match the same age. To obtain $f^{-1}(a)$, a Monte-Carlo simulation is performed comprising:
- The generation of a plurality of weights W,
- The determination of the corresponding age (or perceived age) by computing f(W),
- Creating a lookup table where for a given age a, $f^{-1}(a)$ is an average of all of the weights $W_a$ from the generated weights W such that $f(W_a) = a$.

Once the weight $W_{new}$ is obtained, a face corresponding to this weight may be obtained by inversion of the Principal Component Analyses.

It is therefore possible to simulate an age increase or decrease. An example is given in FIG. 6, which shows in the middle picture the original picture of a face, on the left, a reconstructed picture of a face rejuvenated of 20 years, and on the right a reconstructed picture of a face aged of 20 years.

In this example, the reference database consisted of 400 Caucasian women photographed in frontal pose with a neutral expression and with the same lighting conditions. Vectors modeling shape, appearance and wrinkles were extracted from each face, and PCA were performed according to the above method. The PCA weights were regressed against perceived ages, with the perceived age being rated by 30 uninformed rates to obtain a mean perceived age. Perceived ages in the dataset ranged from 49 to 85 years with an average of 69 years.

As can be seen on FIG. 6, simulated aging impacts the shape of the face: the size of the mouth, eyes and eyebrows tends to diminish, and facial sagging appears at the lower ends of the jaw. It also impacts the appearance of the face: the face globally becomes whiter and yellowish, eyebrows and eyelashes are less visible, and the mouth loses its red color. It finally impacts the wrinkles since more wrinkles appear; and existing wrinkles are deeper, wider and longer.

Preferably, in order to obtain more relevant and precise simulations, the reference population from which the regression function is built may be selected according to ethnicity, geographical location, and/or gender.

Moreover, the regression function used in order to simulate aging of one person may also be obtained from regression of another reference population having another lifestyle, gender, ethnicity or geographical location, in order to simulate its impact on aging.

For instance, reference populations may be elaborated based on similar alcohol or tobacco consumption, nutrition, sun exposition, use of skincare products, etc.

A regression function can then be computed for each of the reference populations, and an aging simulation can be performed on a same face with various regression functions in order to compare the impact of various lifestyles on facial aging.

This comparison can also be performed in order to simulate the impact on visual cues of the use of skincare products or sun protection products as compared to no use of such products.

According to still another example, the impact of environmental factors on aging can be studied by comparing the effect, on a same face, of different regression functions plotted for respective geographical locations.

The invention claimed is:

1. A method for modeling age-related traits of a face, from a picture of the face, the age-related traits being one of wrinkles and age spots, the method comprising:

for each age-related trait of a same type of the wrinkles and the age spots of the face, generating a vector comprising shape and appearance parameters of the age-related trait by acquiring coordinates of a plurality of points of the age-related trait, processing the acquired coordinates to determine the shape parameters, and extracting the appearance parameters from an intensity or a grey level of pixels composing the age-related trait; and generating, from the generated vectors, a single representation vector modeling the age-related traits of the same type of the wrinkles and the age spots in the face, the single representation vector comprising the number of traits in the face, and joint probabilities of the shape and appearance parameters of the traits, the joint probabilities being computed over the face.

2. The method according to claim 1, wherein the age-related traits are wrinkles, and the method further comprises acquiring coordinates of at least five points of each wrinkle, the points being regularly spaced over the wrinkle and comprising at least one point on each end of the wrinkle.

3. The method according to claim 1, wherein the age-related traits are wrinkles, wherein the shape parameters of each of the wrinkles comprise:

coordinates of the center of the wrinkle,
a length of the wrinkle,
an angle of the wrinkle relative to a reference axis, and
a curvature of the wrinkle.

4. The method according to claim 1, wherein the age-related traits are wrinkles, and the appearance parameters of each of the wrinkles comprise a thickness σ and depth A of the wrinkle, the method further comprising:

processing an image to extract the appearance parameters, the image processing comprising, for each wrinkle:
high-pass filtering a part of the image comprising the wrinkle,
warping each wrinkle into a common shape,
fitting a curve on a plurality of transverse profiles of the warped wrinkle to extract, for each profile, a value of a maximum amplitude and a width value of the fitted curve, and
computing A and σ from respectively the values of maximum amplitude and the width values extracted for each of the plurality of profiles.

5. The method according to claim 4, wherein the curve is a second derivative Lorentzian function.

6. The method according to claim 1, wherein the single representation vector further comprises the mean features of the traits of the same type of the wrinkles and the age spots of the face.

7. The method according to claim 1, wherein generating the representation vector comprises:

defining at least one zone in the face, and
for each zone,
computing joint probabilities of the age-related traits of the zone, and
defining a zone vector comprising the joint probabilities of the age-related traits, the number of age-related traits of the zone, and the mean features of the age-related traits of the zone, and
concatenating the zone vectors to obtain the representation vector.

8. The method according to claim 1, wherein the joint probabilities of the age-related traits are approximated by computing joint probabilities of every feature of the vector representing each trait taken two at a time.

9. A method for modeling age of people, the method comprising:

processing pictures of faces of a plurality of individuals forming a reference population, to extract, for each picture,
at least one of a wrinkles model and an age spots model, either one of the wrinkles model and the age spots model being obtained by implementing the method according to claim 1,
a shape model, and
an appearance model;
performing respective principal component analyses, on one or more of the plurality of wrinkles model and the age spot model, the shape model, and the appearance model, to obtain respectively one or more of wrinkles and age spots, shape and appearance weights;
performing a principal component analysis on the wrinkles and/or age spots, shapes and appearance weights, to obtain aggregated weights; and
inferring a relation between aggregated weights and age or perceived age by fitting of a function.

10. The method according to claim 9, wherein the reference population is selected as having similar lifestyles as to at least one of the following:

smoking,
drinking alcohol,
sun exposition,
nutrition, and
use of skincare product.

11. The method according to claim 9, wherein the reference population is selected according to gender, geographical location, and ethnicity.

12. The method according to claim 9, further comprising simulating an age variation of a person by:

selecting one aggregated weight of the plot corresponding to the picture of the face of the person,
identifying the corresponding age or perceived age,
simulating, with the fitted function, an updated aggregate weight for a modified age or perceived age according to the age variation, and
processing the updated aggregate weight to infer a picture of the face of the person corresponding to the age variation.

13. A non-transitory computer-readable medium on which is stored a computer program comprising instructions which, when executed by a processor, performs the method of claim 9.

14. A picture processing unit, comprising:

a memory storing instructions; and
a calculator configured to execute instructions stored in the memory,
wherein the picture processing unit is configured to receive at least one picture of a face of a person and to implement, on the received at least one picture, the method according to claim 9.

15. A non-transitory computer-readable medium on which is stored a computer program comprising instructions which, when executed by a processor, performs the method of claim 1.

16. A picture processing unit, comprising:

a memory storing instructions; and
a calculator configured to execute instructions stored in the memory,
wherein the picture processing unit is configured to receive at least one picture of a face of a person and to implement, on the received at least one picture, the method according to claim 1.

* * * * *